United States Patent [19]

Finkl

[11] Patent Number: 5,728,913
[45] Date of Patent: Mar. 17, 1998

[54] MOISTURE BASED METHOD OF IMPROVING THE PERFORMANCE OF HYDROCARBON FUELS

[76] Inventor: Anthony W. Finkl, 445 E. Royal Flamingo Dr., Sarasota, Fla. 34236

[21] Appl. No.: 769,553

[22] Filed: Dec. 19, 1996

Related U.S. Application Data

[63] Continuation-in-part of Ser. No. 498,854, Jul. 6, 1995, Pat. No. 5,625,118.
[51] Int. Cl.$^6$ ............... C07C 7/20; B01J 23/02; C22C 30/00; F02B 75/12
[52] U.S. Cl. ............... 585/899; 502/341; 502/349; 502/354; 502/330; 502/331; 502/327; 502/336; 502/338; 420/559; 420/580; 420/589; 208/134; 123/1 A
[58] Field of Search ............... 502/341, 349, 502/354, 330, 331, 327, 336, 338; 585/899; 420/559, 580, 589; 208/134; 123/1 A Primary Examiner—Glenn Caldarola
Assistant Examiner—In Suk Bullock
Attorney, Agent, or Firm—Baker & McKenzie

[57] ABSTRACT

A method of treating hydrocarbon fuels with a base metal catalyst is provided for improving the performance of hydrocarbon fuels used internal and external combustion engines The catalyst is a base metal alloy catalyst including tin antimony, lead and mercury. The catalyst operates at ambient temperatures and atmospheric pressure and in the presence of a small but effective quantity of water. The method of treating the fuel with the catalyst may be employed at any point after refining of the fuel and prior to combustion thereof.

13 Claims, 2 Drawing Sheets

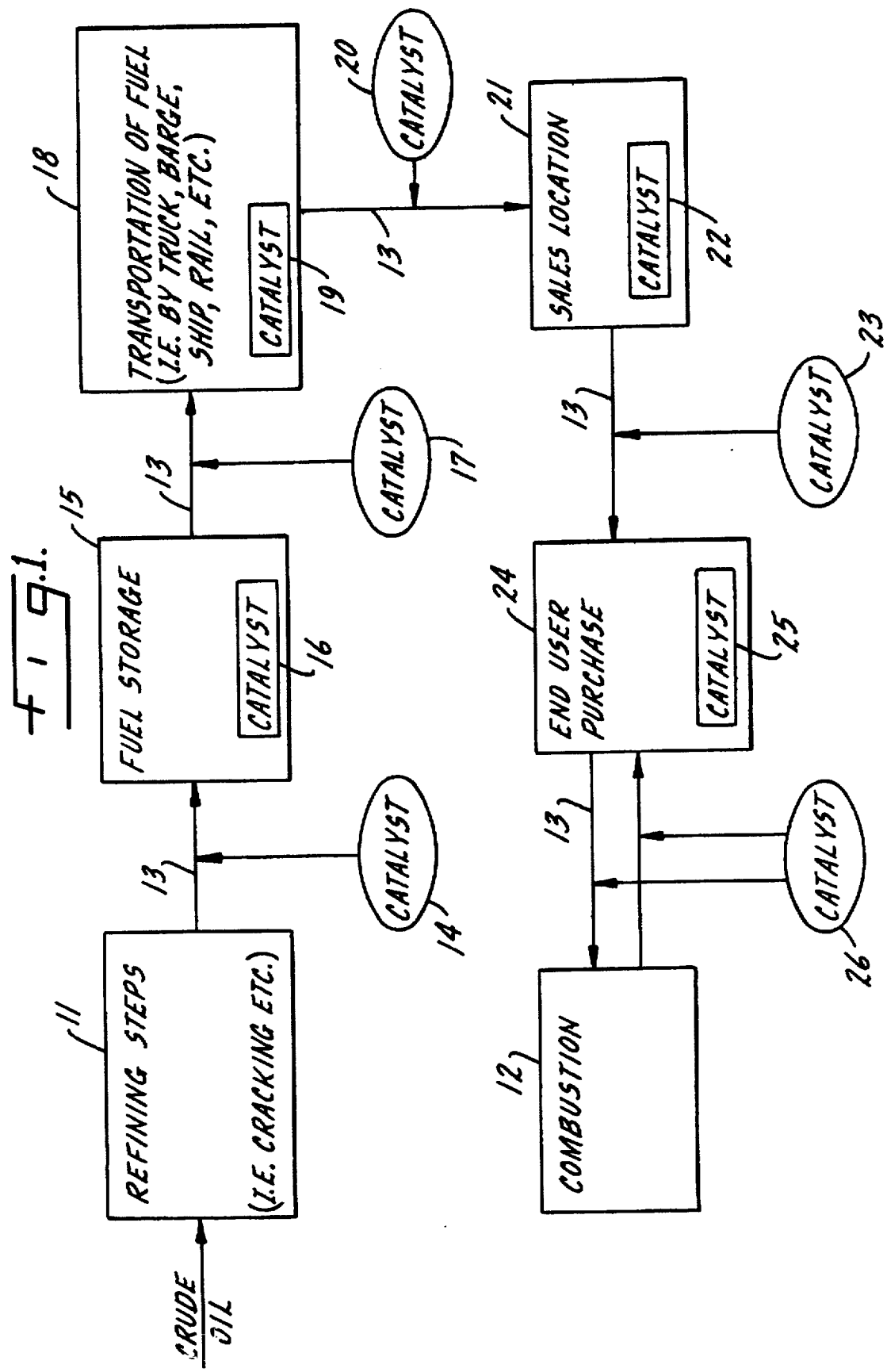

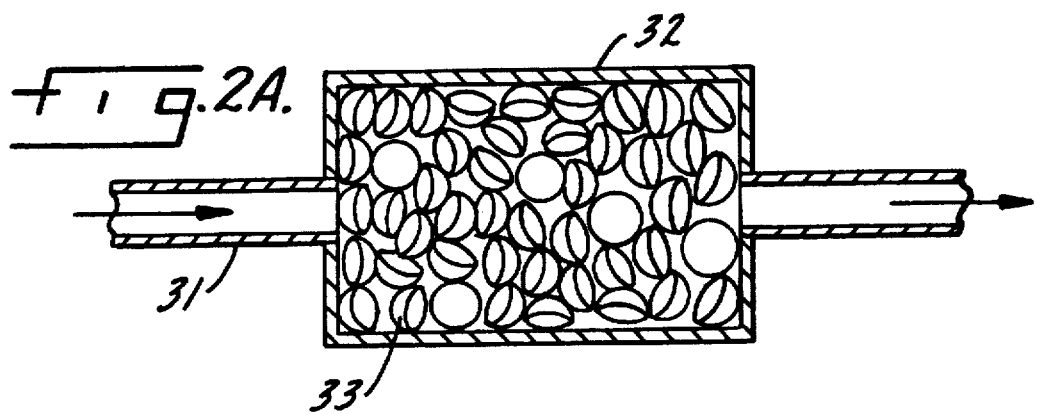
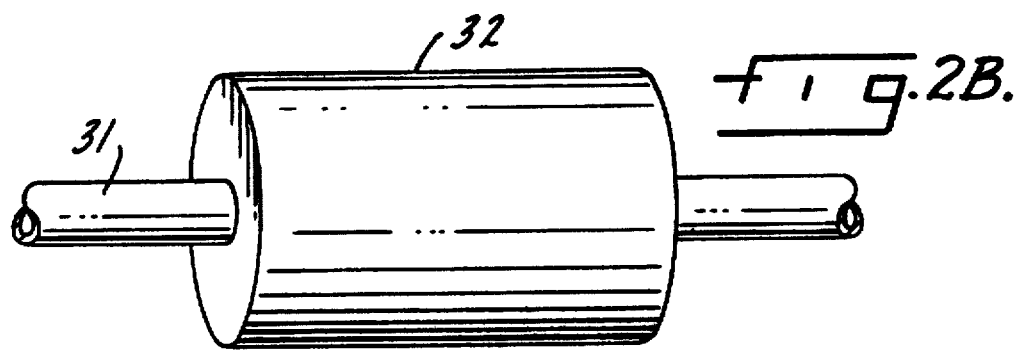
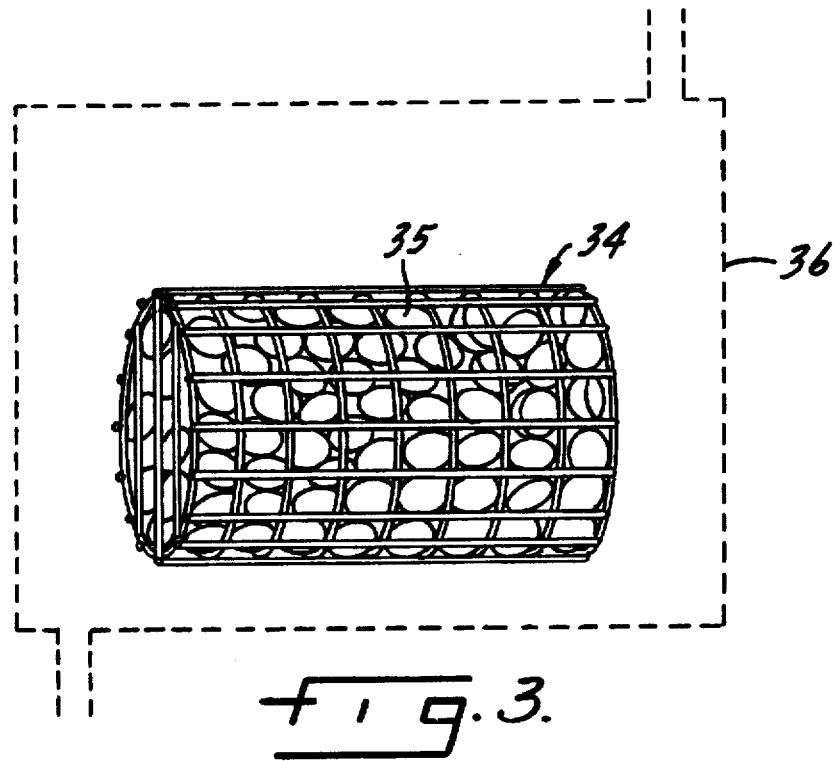

MOISTURE BASED METHOD OF IMPROVING THE PERFORMANCE OF HYDROCARBON FUELS

This application is a continuation-in-part of application Ser. No. 08/498,854 filed Jul. 6, 1995 now U.S. Pat. No. 5,625,118.

FIELD OF THE INVENTION

This invention relates generally to catalysts used to enhance the performance of hydrocarbon fuels. More specifically, this invention relates to a method of exposing hydrocarbon fuels to a base metal catalyst in the presence of a small but effective quantity of moisture prior to combustion of the fuel which is essential to enhance the performance of the fuel.

BACKGROUND OF THE INVENTION

The general concept of employing a base catalyst to improve the combustibility of hydrocarbon fuels in internal combustion engines is known. Broquet used a tin based catalyst in airplane fuel tanks or fuel lines in the 1940s to enable British aircraft to operate on the low-octane and wax forming fuel supplied by Russia for English fighter planes sold to Russia. The general concept of using tin as a catalyst was improved upon and marketed as the Broquet Fuel Catalyst by Advanced Power Systems of the United States. The Advanced Power Systems catalyst is a tin alloy and is specifically directed to reducing hydrocarbon emissions in trucks and buses. Power Plus of South Hampton, England markets a fuel catalyst including tin and other alloys to increase engine efficiency. A similar device has been marketed by Power Makers Ltd., also of England. A base alloy metal catalyst is also disclosed in U.S. Pat. No. 5,393,723 which issued to the inventor.

However, notwithstanding the above, no attempt has been made toward developing a method for exposing hydrocarbon fuels to a modern base alloy metal catalyst after refining and prior to combustion by the retail consumer. Because the treatment of the hydrocarbon fuel with a base alloy metal catalyst slowly diminishes with time, the treatment can take place at any time after the fuel has been refined and before it is combusted, but preferably as close to the time of combustion as is economically and practically feasible.

Thus, there is a long-felt need for a method of treating liquid hydrocarbons at the following points prior to combustion: at the refinery processing outlet, prior to the immediate discharge into the holding tanks or prior to distribution; in the holding tanks; in the distribution fuel line from the holding tanks to the transport vehicle, truck, tank-car or barge; from the transport vehicle to the local distributor's tank; from the local distribution tank to the retailer's tank; from the retailer's tank to the island or gas station retail pumps; from the island or gas station retail pumps to the purchasing vehicle's tank. Further, there is a long-felt need to provide a base alloy metal catalyst treatment of liquid hydrocarbon fuels used in airplanes at equivalent points along the distribution line for aviation fuel. There is also a need for base alloy metal catalyst treatment of hydrocarbon fuel within service cars, boats, motorhomes, trucks, airplanes, jets and reciprocating power engines, both gasoline and diesel. Finally, there is a need for a base alloy metal catalyst treatment of liquid hydrocarbon fuels in power generating plants, fuel-fired boilers, dryers, refiners, turbines, industrial engines and marine engines.

DESCRIPTION OF THE INVENTION

The present invention provides a method of exposing liquid hydrocarbon fuel to a base metal alloy catalyst after refinement of the liquid hydrocarbon fuel and prior to combustion. Thus, the present invention provides a method of exposing liquid hydrocarbon fuel to a base metal alloy catalyst at the refinery processing outlet, in the holding tanks, in the distribution fuel lines, in the transport vehicles (i.e. trucks, tank-cars, barges), in the local distributor's tank, in the retailer's tank, at the retail pump or dispensing units, within the consumer's vehicle (i.e. cars, trucks, planes, industrial equipment) or at any time prior to the combustion of the liquid hydrocarbon fuel within a power generation plant, a fuel-fired boiler, a dryer, refiners, turbines, industrial engines and marine engines. The method employed to catalyze the liquid hydrocarbon fuel of the present invention can be carried out at ambient temperatures, at temperatures as low as −60° F., and temperatures as high as the boiling point of the liquid hydrocarbon fuel. No special handling is required after treatment of the liquid hydrocarbon with the base metal alloy catalyst.

The present invention utilizes a solid tin base alloy metal catalyst. The primary action of the liquid hydrocarbon fuels exposed to the tin base alloy catalyst is the disassociation of the long hydrocarbon chains into shorter, more combustible carbon chains. No electrical charges or magnetic fields are required for the transformation of the fuel.

In this connection it has been noted that if the hydrocarbon fuel is absolutely free of moisture condensation or water, such as chemically pure indolene, no catalytic reaction will take place as there will be no disassociated hydrogen present to complete the disassociated or broken chains. For example: If $H_{34}C_{16}$ is fragmented in half to form two molecules of $H_{18}C_8$, it will be noted that of the original $H_{34}C_{16}$, there is a shortage of two H ion's to complete the $H_{18}C_8$. With a very small amount of water present in the fuel, the two ions of H will be available to complete the molecules of $H_{18}C_8$ or octane, a much more combustible hydrocarbon fuel.

It will be appreciated that water is rarely required as a separate addition to fuels because of the accumulation of moisture condensation as the fuel moves from tank to tank and transport. Only when specialty fuels are taken directly from the refinery to a sealed container and then to a laboratory for testing is the fuel free of water. In operation, the molecules of water break down to liberate two H ions to complete two open ended molecules of $H_{17}C_8$ to form $H_{18}C_8$, the bond that holds $H_2O$ together is very weak. The attraction for H from $H_{17}C_8$ to form $H_{18}C_8$ is stronger than the bond that holds $H_2O$ together. Therefore, if water is not present, no disassociation will take place, so the catalyst is inoperative.

In summary:

With $H_2O$ alone, the catalyst has no activity.

With $H_{(x+2)} C_x$ alone, the catalyst has no activity.

Both must be present to allow the conversion to shorter hydrocarbon.

It is possible that the equation is as follows where the catalyst is $[\alpha]$.

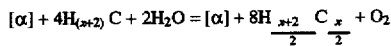

This equation assumes that the hydrocarbon chain is broken into two equal parts which may or may not be true.

It is well known that long hydrocarbon chains contain more BTU's than short chains. As jet fuel, gasoline, and diesel fuel is a mixture of long and short hydrocarbon chains, the desirability of breaking up the long chains into shorter chains arises. The justification is that the longer the chain, the more time is required to oxidize the fuel. With high crank shaft speed, the combustion period is very short, so a substantial amount of unburned fuel is passed out through the exhaust into the atmosphere. By having more short hydrocarbon chains present, more fuel can be burned in a shorter time producing a much "clean" exhaust. In other words, the engine becomes more efficient with the catalyzed fuel.

It has now been determined that the shape of the catalyst is important for a number of reasons. As the catalyst is not porous from a mechanical standpoint, only the surface is presented to the fuel. It would thus be expected that the more surface that could be presented to the fuel, the less weight of catalyst would be required to "treat" a known quantity of fuel. However, this is not quite true. The rate of solidification after pouring the molten catalyst into a convenient form is very critical. If poured too slow or too fast, the solidification time produces an inactive grain structure that would not catalyze the fuel. It has thus been determined that the relationship of surface to mass is important, as it relates to the rate of cooling to solidification.

A variety of shapes including small donuts, washers, spheres, partial spheres, rods, cylinders (both hollow and solid) and grids have performed successfully.

The composition of the catalyst includes tin, antimony, lead, mercury and thallium. The preferred composition of the catalyst is as follows in weight percent:

| Tin | 60–65.40 |
| --- | --- |
| Antimony | 18–20 |
| Lead | 4.5–5.5 |
| Mercury | 12–14 |
| Thallium | .05–1.0 |

The presence of thallium in the catalyst is preferred because it improves the efficiency and storage quality of the treated fuel. The addition of Thallium to the tin base alloy catalyst is not clearly understood in the chemical sense other than it appears to increase the activity of the catalyst, thus requiring less reaction surface.

The elements iron and/or copper and/or silver appear to contribute to the efficiency of the treatment if they are in the chemical proximity of the catalyst but is not essential for the functioning of the catalyst. They are not, however, considered to be components of the catalyst.

The catalyst of the present invention performs its catalytic function at atmospheric pressure at temperatures ranging from at least 140° F. to at least −50° F. Obviously the operating temperature should be less than the atmospheric boiling temperature of the fuel.

The amount of catalyst required depends upon the delivery system as well as the shape of the formed catalyst. If the catalyst is placed in the fuel storage tank, about 20 grams of catalyst will be required per 7.5 kilowatt output of the engine. No weight loss of the catalyst has been detected after 5,000 hours of operation.

Spectroanalysis shows an apparent chemical change in the composition of the treated fuel with an increase in shorter, more desirable hydrocarbon chains. The result is a reduction in the combustion flame propagation time or the time it takes for the ignited fuel to extend from the spark plug to the piston. When the catalyst of the present invention is utilized, the spark may be retarded about 4° in modern internal combustion engines without any loss of power providing a shorter combustion period. Because the engine's spark setting can be retarded 4°, the generation of $NO_x$ as an exhaust gas product will be reduced. Further, use of the catalyst of the present invention will result in increased horsepower because of more energy generated during the combustion process and improved combustion efficiency. Because the hydrocarbon fuel will be more completely burned, the emission of hydrocarbon gases, CO as well as $NO_x$ and unburned hydrocarbons (HC) will be reduced. This result is verifiable with exhaust gas analyzers. Further, carbon deposits within the engine will also be reduced as the deleterious deposits are gradually consumed by the more complete oxidation process within the confines of the combustion chamber. In diesel engines, normal exhaust soot or fine carbon particulates are greatly reduced.

It is therefore a general object of the present invention to provide a method of treating liquid hydrocarbon fuels with a base alloy metal catalyst resulting in more complete fuel combustion and higher engine horsepower output and fuel economy.

A related object of the present invention is to provide a method of treating hydrocarbon fuels with a base alloy metal catalyst so that the flame combustion propagation time will be reduced and the normal spark advance will be retarded without loss of engine power. Another object of the present invention is to reduce $NO_x$ exhaust discharge caused by the combustion of liquid hydrocarbon fuels.

Still another object of the present invention is to provide a method of treating hydrocarbon fuels with a base alloy metal catalyst which results in a reduction of detrimental exhaust emissions including $NO_x$, CO and unburned or incompletely combusted hydrocarbon gases.

It is also an object of the present invention to reduce carbon deposits within the combustion chamber as well as wax-like precipitates that can cause fuel blockage in the engine fuel lines and carburetor during cold operating conditions.

With diesel fuels very low temperature operating conditions can cause wax-like precipitates unless particular care is taken in refinement to increase the cetane rating. Catalyzed diesel fuel appears to have increased the cetane rating two or three points.

Yet another object of the present invention includes increased valve life and increased engine life.

A still further object of the present invention is an apparent increase in the octane rating of the catalyst-treated fuel.

Other objects and advantages of the invention will be apparent to those of ordinary skill in the art from the following detailed description.

BRIEF DESCRIPTION OF THE DRAWINGS

The present invention is illustrated more or less diagrammatically in the accompanying drawing wherein:

FIG. 1 is a schematic diagram of alternative methods of treating liquid hydrocarbon fuel with a base alloy metal catalyst, all in accordance with the present invention;

FIG. 2A is a sectional diagram illustrating the placement of the base alloy metal catalyst in a fuel line;

FIG. 2B is a perspective view of fuel line shown in FIG. 2A; and

FIG. 3 is a perspective view of a screened container containing a base alloy metal catalyst of the invention for use in a fuel tank or fuel storage tank.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

As indicated in FIG. 1, the method of treating liquified hydrocarbon fuel may take place at any time after the refining stage 11 is complete and prior to the combustion stage 12. That is, the refined fuel indicated at 13 may be treated with the base metal catalyst at 14, before the fuel is stored at 15. In addition, the fuel may be treated at 16, while it is being stored. Or, the fuel 13 may be treated at 17, between the time it is being stored at 15 and transported at 18. The fuel may also be treated at 19, while it is being transported. The fuel may also be treated at 20 between the time it is being transported by truck, barge, rail-car or similar transportation means and its arrival at a principal sales or distribution location 21. Again, the fuel can be treated at 22, while it is being stored at the sales or distribution location 21. The fuel may also be treated at 23 while it is being dispensed to the consumer at 24 from the sales location 21. The fuel 13 may also be treated at 25, after the consumer has purchased the fuel and while it is contained within a fuel tank 24. A catalyst 26 may be employed in the fuel line between the fuel storage tank at 24 and the internal combustion engine 12. In addition, the catalyst 26 may be employed in a fuel return line where excess fuel is returned from the combustion engine at 12 to the fuel storage tank at 24. For convenience of description, the fuel lines 13, 31 may sometimes hereinafter be referred to as flow lines and the tanks or containers 11, 15, 18, 21, 24 and 12 as reservoirs.

Turning to FIGS. 2A and 2B, a fuel line is shown at 31 which extends between a fuel storage tank (such as the one shown at 24 in FIG. 1) and an internal combustion engine (such as the one shown at 12 in FIG. 1). The fuel line 31 may be attached to a cylindrical or other functionally-shaped catalyst container 32 which contains a plurality of base alloy metal catalyst shown generally at 33. In FIG. 2A, the base alloy metal catalyst shapes 33 are half-spheres; however, as noted above and below, other suitable shapes may be employed. In addition, it will be apparent to those skilled in the art that the fuel may be treated before it reaches the engine or through a return line which returns fuel from the engine to the fuel storage tank.

Turning to FIG. 3, a screen-type device 34 may be employed to treat liquid hydrocarbon fuel contained within a fuel storage tank shown in phantom at 36. Again, in FIG. 3, the catalyst is provided as spheres shown generally at 35; however, other suitable shapes may be employed. The screen-type device 34 may be used in a vehicle fuel tank or a fuel storage tank at refineries, distribution points or retail outlets.

After the liquid hydrocarbon fuels have been treated by the catalyst to insure improved combustion, the life of the treated fuel line is finite if the catalyst presence is removed from the fuel. It, therefore, becomes very desirable to place sufficient catalyst within the fuel reservoir to maintain the fuel in a catalyzed condition, thus preventing the fuel from reforming back to its original chemical composition. The catalyzed fuel without the presence of the catalyst, starts to revert back to its original condition in about 72 hours. For this reason, it is preferred that the catalyst be present in the last storage tank prior to combustion.

The preferred bas metal catalyst may be characterized for convenience as a tin-mercury-antimony-lead-thallium composition of the following general formula in weight percent:

| | |
|---|---|
| Tin | 60–65.4 |
| Antimony | 18–20 |
| Lead | 4.5–5.5 |
| Mercury | 12–14 |
| Thallium | .1–.5 |

Tin is necessary as a support for the remaining components and further it is known that tin acts to lubricate the upper cylinder area of the engine. If tin is present in an amount substantially less than 50%, then these objectives will not be met and further it is believed that the distribution of electrical charge over the molecular structure of the fuel molecules will not be substantially altered. It is believed that no detrimental effect would result in tin being present in an excess of 70%, however, tin in excess of this weight percent would lower the amount of the other constituents thereby adversely affecting the performance of the catalyst.

The combination of antimony, lead and mercury will work effectively with tin in altering the distribution of electrical charge over the molecular structure of the hydrocarbon molecules. Antimony should be present in amounts ranging from 15% to 25% and preferably from about 18% to about 20%. Lead should be present in amounts ranging from 3% to 7% and preferably about 4.5% to about 5.5%. Mercury should be present in amounts ranging from 10% to 16% and preferably from about 12% to about 14%.

It is also believed that the addition of thallium to the above-mentioned combination will substantially increase the activity and effectiveness of the catalyst. The amount of thallium required is not excessive and thallium need only be present in an amount ranging from 0.05% to about 1% and preferably from about 0.1% to about 0.5%. Thallium in excess of this amount will adversely affect the economics of the catalyst without substantially increasing the performance of the catalyst and therefore thallium in amounts greatly exceeding 0.5% are not preferred.

Various shapes of the formed catalyst will be effective. Specifically, small donuts, washer-shapes, spheres, partial spheres, rods, cylinders or grids will be effective. The shapes may be hollow or solid depending upon the amount of the surface area required.

The catalyst of the present invention provides numerous benefits that improve engine performance, increase engine life and increase component life. Specifically, spark plug electrode erosion is reduced when the catalyst of the present invention is used to process fuel prior to combustion. During normal engine operation, coatings are formed on the electrode and on the ceramic insulator of the spark plug. When the catalyst of the present invention is used to process the fuel prior to ignition at the spark plug, these coatings are greatly reduced to a point where the ceramic insulator appears new after several thousand miles of operation. As a result of the reduction of these two spark plug deterrents, spark plug life is doubled when compared to the accepted spark plug life for the ignition systems that were evaluated including coil systems, condenser systems, points systems, capacitor discharge systems, or pointless electronic systems.

Another deterrent to engine performance addressed by the catalyst of the present invention is crankcase sludge or unwanted deposits. The crankcase sludge generated by normal combustion will be treated by the catalyst and will gradually go into solution in the oil and will thereafter be filtered out by a standard oil filter. Because of this cleansing operation, additional oil filter changes are recommended such as every 2,000 to 3,000 miles for the first 6,000 miles. With new or rebuilt engines, the filter changes may be extended to every 6,000 miles for normal operating conditions of gasoline engines and every 300 hours for diesel engines after the recommended "break-in period". It is not believed that the catalyzed fuel effects the "break-in period." It is not believed that the catalyzed fuel effects the "break-in period".

The catalyst of the present invention also eliminates or greatly reduces other deposits commonly found in engines. Specifically, varnish-like piston wall coatings, carbon deposits on piston domes and the top ring areas as well as the sludge in the oil control ring are almost completely eliminated or at least greatly reduced in less than 6,000 miles after the employment of a catalyst made in accordance with the present invention.

All of the above engine improvements are the result of the catalyst treated fuel that provides an internally cleaner engine with less oil contamination from unburned hydrocarbons resulting in fewer oil changes, less filter changes, longer spark plug life and increased engine life.

The catalyst of the present invention also addresses certain environmental concerns. Specifically, the catalyst provides a more complete combustion process and therefore reduces detrimental exhaust emissions recognized as damaging to the environment.

Specifically, many gasoline fuels today are oxygenated for the overriding purpose of producing a cleaner combustible product, this characteristic being driven by the need to reduce deleterious exhaust emissions. Other side effects, many of them undesirable, are disregarded. For example a) A major problem reported in several large cities is the nausea caused by the compounds formed in oxygenated exhaust fumes during periods of temperature inversions of cold weather.

Using catalyzed fuel in place of the oxygenated fuel eliminates this problem.

b) Oxygenated gasoline in tropical or sub-tropical climates have a strong preponderance to encourage the growth of very undesirable bacteria in this fuel when left undisturbed in tanks. In warm, humid areas such as Florida, after a period of ten to twelve weeks, the mass of growths in oxygenated gasolines clogs carburetor jets and fuel injection systems to a point of incapacitating engine operation. Replacing oxygenated gasolines with catalyzed gasoline as described herein greatly reduces this problem no longer encourages bacterial growth. Using catalyzed gasoline will produce cleaner exhaust emissions than the chemically oxygenated fuel and at the same time, almost completely eliminates bacterial growth in the given time frame.

Further, definitive tests have shown that the improved thallium catalyst treated fuels of this invention do not polarize or render dead the action of catalyst under a myriad of operating conditions or chemical additives to fuels such as:

| A. Tetraethyl of Lead | F. Vegetable Oil |
| B. Ash Reducers | G. Oxygenators |
| C. Alcohol | H. Tricresseline Phosphate |
| D. Benzene | I. Viscosity Improvers |
| E. Mineral Oil | J. Normal Engine Lubricants |

The catalyzed liquid hydrocarbon fuels treated by the improved catalyst may be used in internal combustion engines such as:

| A. Gasoline engines: | |
| --- | --- |
| 1. Four Cycle | 3. Super Charged |
| 2. Two Cycle | 4. Tubo Charged |
| B. Diesel engines: | |
| 1. Four Cycle | 3. Super Charged |
| 2. Two Cycle | 4. Tubo Charged |
| C. Wankel Rotary Engines | |
| D. Jet Engines | |

The following major benefits are obtained to a greater or lesser degree.

A. More complete combustion
  1. Lower deleterious exhaust emissions.
    a) Lower Unburned HC's
    b) Lower $No_x$
    c) Lower CO
  2. Greater fuel economy; i.e., from 3% to 10%.
  3. Greatly reduced smoke particulate.
  4. Slightly increased horsepower.
  5. Greatly reduced carbon build-up on port valves, and combustion chambers.
  6. Faster engine starts.
B. Reduced bacterial growth.
C. Improved fuel stabilization.
D. Increased engine life.
E. Eliminate or reduced combustion detonation known as "Spark Knock" from carbon build-up in the combustion chamber.
F. An apparent increase in octane rating for gasoline and cetane ratings for diesel fuels.

Thus, an improved method of treating hydrocarbon fuels is disclosed. The method may be employed at any point between the refining of the fuel and the combustion of the fuel. The catalyst is a base metal alloy catalyst that includes tin and thallium. No weight change will be detected in catalyst made in accordance with the present invention after 5,000 hours of active service. Thus, the ultimate durability of the catalyst made in accordance with the present invention has yet to be determined.

While only certain embodiments have been set forth, alternative embodiments in various modifications to the formulations set forth above will be apparent to those skilled in the art. These and other alternatives are considered equivalents and within the spirit and scope of the present invention.

I claim:

1. A method of improving the performance of post-refined liquid hydrocarbon fuels consisting of the step of contacting a refined liquid hydrocarbon fuel with a base metal alloy catalyst having the following components in weight percent:

Sn from about 60 to 70

Sb from about 15 to 25

Pb from about 3 to 7

Hg from about 10 to 16

Tl from about 0.05 to 1 in the presence of a source of H ions which have a greater affirmity for short chain hydrogen depleted hydrocarbons than for their pre-treatment form.

2. The method of claim 1 further characterized in that the source of H ions is a small but effective quantity of water.

3. The method of claim 2 further characterized in that the contact between the fuel and the base metal alloy catalyst occurs in a reservoir.

4. The method of claim 2 further characterized in that the contact between the fuel and the base metal alloy catalyst occurs in a flow line.

5. The method of claim 1 further characterized in that the contact between the fuel and the base metal alloy catalyst occurs in the presence of iron, copper, silver or alloys thereof.

6. The method of claim 1 further characterized in that the base alloy metal catalyst has a variety of shapes including small donuts, washers, spheres, partial spheres, rods, cylinders (hollow and solid), and grids.

7. The claim 1 further characterized in that base metal alloy catalyst has the following composition by weight percent:

Sn from about 60–65.4

Sb from about 18–20

Pb from about 4.5–5.5

Hg from about 12–14

T1 from about 0.1–0.5

8. The method of claim 7 further characterized in that the source of H ions is a small but effective quantity of water.

9. The method of claim 8 further characterized in that the contact between the fuel and the base metal alloy catalyst occurs in a reservoir.

10. The method of claim 8 further characterized in that the contact between the fuel and the base metal alloy catalyst occurs in a flow line.

11. The method of claim 7 further characterized in that the contact between the fuel and the base metal alloy catalyst occurs in the presence of iron, copper, silver or alloys thereof.

12. The method of claim 7 further characterized in that the base alloy metal catalyst has a variety of shapes including small donuts, washers, spheres, partial spheres, rods, cylinders, (hollow and solid), and grids.

13. The method of claim 7 further characterized in that the catalyst is present in the last storage tank prior to combustion.

* * * * *